G. N. TSUMURA.
NUT LOCK.
APPLICATION FILED FEB. 18, 1919.

1,333,742.

Patented Mar. 16, 1920.

INVENTOR
George N. Tsumura,
By O. M. Vrooman,
HIS ATTORNEY.

UNITED STATES PATENT OFFICE.

GEORGE N. TSUMURA, OF MOUNTAIN VIEW, CALIFORNIA.

NUT-LOCK.

1,333,742.   Specification of Letters Patent.   Patented Mar. 16, 1920.

Application filed February 18, 1919. Serial No. 277,864.

*To all whom it may concern:*

Be it known that I, GEORGE N. TSUMURA, a subject of the Emperor of Japan, residing at Mountain View, in the county of Santa Clara and State of California, have invented certain new and useful Improvements in Nut-Locks, of which the following is a specification.

My invention relates to nut-locks that will absolutely lock the nut onto a bolt, preventing the same from jarring loose and working off, and the objects are:

First, to provide a nut-lock that will lock the nut at a sixth, or less, of a turn of the nut.

Second, to provide a nut-lock that will permit the nut to be removed from the bolt or stud by manually releasing said lock.

Third, to provide a nut-lock that will not require a special wrench.

Fourth, to provide a nut-lock that may be attached to bolts and nuts now in use by slightly altering said bolts and nuts.

Further objects and advantages will appear in the following description and in the accompanying drawings, forming a part of this specification, and then more particularly pointed out in the claims, it being understood that various changes in form, proportion and minor details of construction may be resorted to within the scope of the appended claims.

Figure 1:
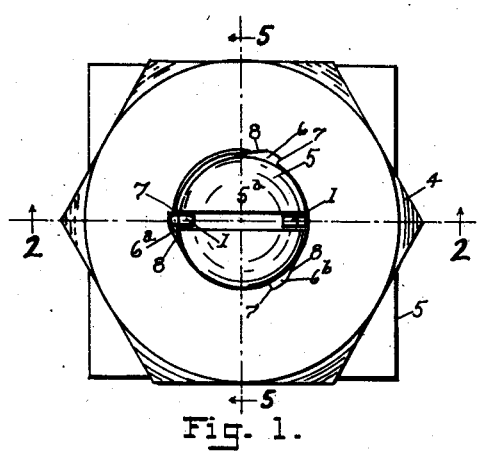
Figure 1 is an end view of a bolt with nut and lock attached thereto.
Figure 2:
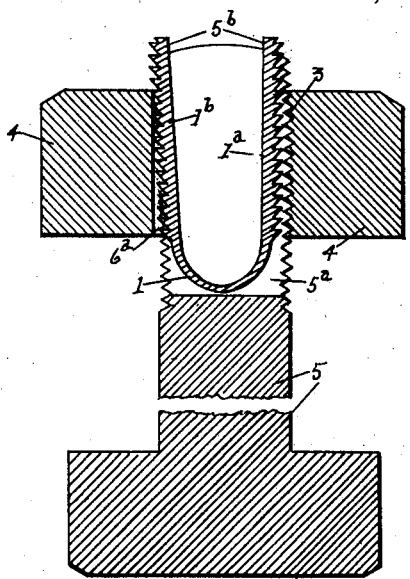
Fig. 2 is a sectional view on line 2—2 of Fig. 1, parts broken away.
Figure 3:
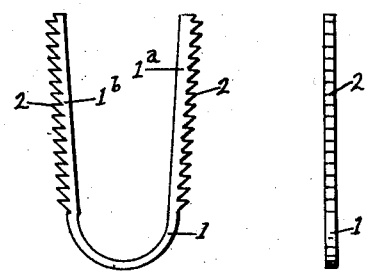
Fig. 3 is a side view of the spring locking member.
Figure 4:
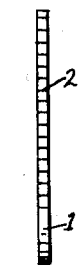
Fig. 4 is an edge view of Fig. 3.
Figure 5:
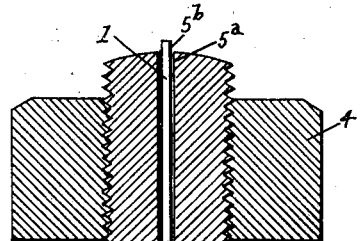
Fig. 5 is a sectional view on line 5—5 of Fig. 1 showing the slot in the bolt or stud adapted to receive the spring locking member shown in Figs. 3 and 4.
Figures 6, 7:
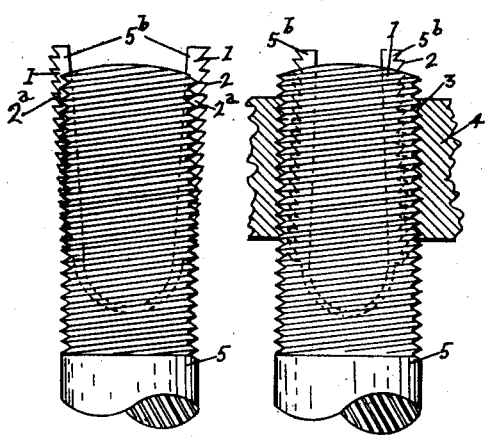
Fig. 6 is a side view of the threaded portion of a bolt or stud, showing the spring locking member in place.
Fig. 7 is a view showing the spring locking member contracted allowing same to be removed by disengaging it from the nut threads.

My nut-lock, forming the subject matter of the present invention, consists of a U-shaped spring locking member 1 made of spring steel or other suitable material. The outer edges of the legs $1^a$—$1^b$ of the spring locking member 1 are provided with a series of teeth or barbs 2, said teeth or barbs preferably being pointed slightly upward or toward the ends of the legs $1^a$—$1^b$, adapted to hold the spring locking member in place by engaging the threads 3 of a nut 4.

A threaded bolt or stud is shown at 5, having a slot $5^a$ sawed therein, diametrically and parallel with the axis of the bolt or stud and of sufficient depth to allow the spring locking member 1 to set in, leaving a small portion protruding beyond the end of the bolt or stud as shown at $5^b$.

The distance between the outer edges of the legs $1^a$—$1^b$ of the spring locking member 1 is slightly greater than the diameter of the bolt or stud in which it is used as shown at $2^a$, adapted to friction against the threads 3 of the nut 4. In the threaded portion of the nut 4 is shown a plurality of notches 6—$6^a$—$6^b$ extending the full length of the threaded portion and having one wall of each notch parallel with the radius of the bore of the nut 4 as shown at 7 and the other wall slanting, forming inclined surfaces as shown at 8 adapted to contract the spring locking member 1 when the nut 4 is screwed on; the walls 7 forming shoulders against which the spring locking member 1 rests or engages when force is applied to remove the nut thus preventing the nut from turning off until released.

The part $5^b$ of the spring locking member 1 permits of manually springing together the legs $1^a$—$1^b$ which allows the nut 4 to be screwed off the bolt 5, after removing the spring locking member 1.

It will be seen from the foregoing description that my nut-lock can be applied to bolts and nuts of various sizes and for various purposes by slightly altering the size and shape of the U shaped spring locking member 1 and the teeth or barbs 2 to correspond to the bolt and nut used.

Having thus described my invention, what I claim as new and desire to secure by Letters Patent is;

1. The combination with a threaded bolt or stud having a slot therein, diametrically and parallel with the axis thereof, of a U shaped spring locking member adapted to rest in said slot; teeth or barbs on the outer edges of each leg of the U shaped spring locking member; a nut adapted to be screwed onto said bolt or stud, said nut being provided with a plurality of notches in the threaded portion, said notches extending the full length of the threaded portion of the nut and having one wall substantially parallel with the radius of the bore of the nut and the opposite wall at an angle thereto forming inclined surfaces whereby, when the nut is screwed onto the bolt or stud, the spring locking member will be contracted by said inclined surfaces, and the opposite wall will serve as a catch or shoulder to engage the spring locking member to lock the nut in place, substantially as shown and described.

2. The combination with a threaded bolt having a slot extending in a distance from the end of the bolt and parallel with the axis thereof, said slot being on a diameter of the bolt, of a U shaped spring locking member adapted to rest in said slot; a plurality of teeth or barbs on the outer edges of each leg of the U shaped spring locking member, said teeth or barbs pointing slightly toward the upper ends of said legs; a nut adapted to be screwed onto said bolt, the threads of which engage the teeth or barbs on the spring locking member thereby holding the spring locking member in place, said nut being provided with a plurality of notches in the threaded portion thereof, said notches extending the full length of the threaded portion thereof, one wall of each notch being parallel with the radius of the bore of the nut and the opposite wall at an angle thereto, forming inclined surfaces adapted to contract said spring locking member when the nut is screwed onto the bolt, the first mentioned wall serving as a catch or shoulder adapted to engage the spring locking member to lock said nut in place and means whereby the spring locking member may be disengaged from said notches, substantially as shown and described.

In testimony whereof I hereby affix my signature this 11th day of Feb., 1919.

GEORGE N. TSUMURA.